US011455313B2

(12) United States Patent
Lyons et al.

(10) Patent No.: US 11,455,313 B2
(45) Date of Patent: Sep. 27, 2022

(54) SYSTEMS AND METHODS FOR INTELLIGENT PROSPECT IDENTIFICATION USING ONLINE RESOURCES AND NEURAL NETWORK PROCESSING TO CLASSIFY ORGANIZATIONS BASED ON PUBLISHED MATERIALS

(71) Applicant: AON GLOBAL OPERATIONS SE, SINGAPORE BRANCH, Singapore (SG)

(72) Inventors: Oisin Lyons, Mountjoy (IE); Barry Sheridan, Mountjoy (IE)

(73) Assignee: AON GLOBAL OPERATIONS SE, SINGAPORE BRANCH, Singapore (SG)

( * ) Notice: Subject to any disclaimer, the term of this patent is extended or adjusted under 35 U.S.C. 154(b) by 69 days.

(21) Appl. No.: 16/802,225

(22) Filed: Feb. 26, 2020

(65) Prior Publication Data
US 2021/0019311 A1    Jan. 21, 2021

Related U.S. Application Data

(63) Continuation of application No. 15/850,047, filed on Dec. 21, 2017, now Pat. No. 10,606,853.
(Continued)

(51) Int. Cl.
*G06F 7/00* (2006.01)
*G06F 16/2458* (2019.01)
(Continued)

(52) U.S. Cl.
CPC ........ *G06F 16/2465* (2019.01); *G06F 16/248* (2019.01); *G06F 16/2468* (2019.01);
(Continued)

(58) Field of Classification Search
CPC ............ G06F 16/2465; G06F 16/2468; G06F 16/285; G06F 16/3334; G06F 16/951; G06F 16/248; G06Q 30/0202
(Continued)

(56) References Cited

U.S. PATENT DOCUMENTS 7,461,044 B2    12/2008   Salahshour et al.
7,962,903 B1     6/2011   Ross
(Continued)

FOREIGN PATENT DOCUMENTS

CN    102591992    7/2012
CN    103514191    1/2014
(Continued)

OTHER PUBLICATIONS

International Preliminary Report on Patentability issued in International Application No. PCT/SG2020/050074 dated Aug. 26, 2021, 8 pages.
(Continued)

*Primary Examiner* — Isaac M Woo
(74) *Attorney, Agent, or Firm* — Gardella Grace P.A.

(57) ABSTRACT

In an illustrative embodiment, methods and systems for identifying prospective new clients based upon review of current clients include accessing a book of business of a user of a transactional platform to identify current clients, identifying, key terms relevant to each of the clients, automatically performing Internet searches, each search using different groupings of the key terms, automatically deriving from web sites of the search results information regarding a number of prospects, and presenting prospect information to the user. The key terms may be identified through performing web searches and web scraping of online information related to the current clients. The clients may be categorized based upon organizational attributes prior to searching. An
(Continued)

initial set or sets of key terms may be filtered through performing a number of data analyses on the key terms.

18 Claims, 11 Drawing Sheets

Related U.S. Application Data

(60) Provisional application No. 62/437,989, filed on Dec. 22, 2016.

(51) Int. Cl.
*G06F 16/248* (2019.01)
*G06F 16/28* (2019.01)
*G06F 16/951* (2019.01)
*G06F 16/33* (2019.01)
*G06Q 30/02* (2012.01)

(52) U.S. Cl.
CPC ........ *G06F 16/285* (2019.01); *G06F 16/3334* (2019.01); *G06F 16/951* (2019.01); *G06Q 30/0201* (2013.01)

(58) Field of Classification Search
USPC ................................................. 707/600–899
See application file for complete search history.

(56) References Cited

U.S. PATENT DOCUMENTS

| | | | |
|---|---|---|---|
| 9,317,574 B1 | 4/2016 | Brisebois et al. | |
| 9,390,240 B1 | 7/2016 | Brisebois et al. | |
| 10,606,853 B2 | 3/2020 | Lyons et al. | |
| 2006/0010217 A1 | 1/2006 | Sood | |
| 2006/0184485 A1 | 8/2006 | Horvitz | |
| 2008/0243675 A1 | 10/2008 | Parsons et al. | |
| 2009/0204569 A1 | 8/2009 | Bowden et al. | |
| 2012/0239650 A1 | 9/2012 | Kim et al. | |
| 2013/0339337 A1 | 12/2013 | Alkhateeb et al. | |
| 2014/0304829 A1 | 10/2014 | Oliver et al. | |
| 2016/0132800 A1 | 5/2016 | Davar et al. | |
| 2017/0091270 A1* | 3/2017 | Guo ................ | G06Q 10/06393 |
| 2018/0181625 A1 | 6/2018 | Lyons et al. | |
| 2018/0181626 A1 | 6/2018 | Lyons et al. | |
| 2021/0200759 A1 | 7/2021 | Lyons et al. | |

FOREIGN PATENT DOCUMENTS

| | | |
|---|---|---|
| CN | 105488697 | 4/2016 |
| CN | 110622180 | 12/2019 |
| CN | 110637316 | 12/2019 |
| EP | 3559871 | 10/2019 |
| EP | 3559888 | 10/2019 |
| WO | 2007034179 | 3/2007 |
| WO | 2013109524 | 7/2013 |
| WO | 2018117975 | 6/2018 |
| WO | 2018117976 | 6/2018 |

OTHER PUBLICATIONS

Examination Report issued in European Application No. 17835723.2 dated Jul. 20, 2020.
Office Action issued in Chinese Application No. 201780085272.8 dated Jun. 22, 2020 (with translation).
International Search Report and Written Opinion issued in PCT Application No. PCT/SG2017/050643 dated Mar. 6, 2019.
International Preliminary Report on Patentability issued in PCT Application No. PCT/SG2017/050643 dated Jun. 25, 2019.
Non-Final Office Action issued in U.S. Appl. No. 15/850,047 dated Nov. 8, 2019.
International Search Report and Written Opinion issued in PCT Application No. PCT/SG2017/050644 dated Mar. 8, 2018.
International Preliminary Report on Patentability issued in PCT Application No. PCT/SG2017/050644 dated Jun. 25, 2019.
Examination Report issued in European Application No. 17836071.5 dated Jun. 25, 2020.

* cited by examiner

| Company Name | Country | State | City | Revenue | URL |
|---|---|---|---|---|---|
| Bridges and Rail | Netherlands | S. Holland | Rotterdam | $12.94B | http://www.... |
| Oil Conglomerate | U.S.A | TX | Dallas | $369.43B | http://www.... |
| Acme Building Corp. | Japan | Tokyo | Koto-ku | $11.75B | http://www.... |
| The Generic Group | Germany | BY | Munich | N/A | http://www.... |
| International Inc. | U.S.A | NY | New York | $128.81B | http://www.... |
| Engineering Co. | Canada | ON | City | Private Company | http://www.... |
| Consultants Org. | Japan | Unknown | City | N/A | http://www.... |
| Lumber and Mills | U.S.A | ME | City | $2.48B | http://www.... |

Find Additional Information for Prospects *404*

Export Data *402*

FIG. 4A

SYSTEMS AND METHODS FOR INTELLIGENT PROSPECT IDENTIFICATION USING ONLINE RESOURCES AND NEURAL NETWORK PROCESSING TO CLASSIFY ORGANIZATIONS BASED ON PUBLISHED MATERIALS

RELATED APPLICATIONS

This application is a continuation of and claims priority to U.S. patent application Ser. No. 15/850,047, entitled "Systems and Methods for Intelligent Prospect Identification Using Online Resources and Neural Network Processing to Classify Organizations based on Published Materials," filed Dec. 21, 2017, which claims priority to U.S. Provisional Patent Application Ser. No. 62/437,989, entitled "Systems and Methods for Intelligent Prospect Identification Using Online Resources and Neural Network Processing to Classify Organizations based on Published Materials," filed Dec. 22, 2016. This application is related to U.S. Provisional Patent Application Ser. No. 62/438,015 entitled "Systems and Methods for Identifying and Reducing Redundant Electronic Communications Data and Filtering Electronic Communications Data for Analysis" and filed Dec. 22, 2016; and to U.S. Provisional Patent Application Ser. No. 62/438,340 entitled "Systems and Methods for Data Mining of Historic Electronic Communication Exchanges to Identify Relationships, Patterns, and Correlations to Deal Outcomes" and filed Dec. 22, 2016. All above identified applications are hereby incorporated by reference in their entireties.

BACKGROUND

Prospect identification seeks to accurately develop a list of prospective business clients that fit a broker's interest in insurance products and industries (i.e., the broker's "appetite"). Brokers typically have a current list of clients that defines their appetite, and they typically wish to find other similar companies. The overall objective of the prospect identification development is to enhance and automate several aspects of client prospect identification, discovery, and analysis using a combination of machine learning, natural language processing, mathematical modeling, and relational database modeling. By doing so, prospect results are provided more efficiently and at a higher quality.

Currently, prospecting is done on an ad-hoc basis, with brokers and account executives discovering prospects through word of mouth, industry publications, etc. Information must be manually gleaned through extensive searching and analysis, and all this information is tracked in spreadsheets, lists, and other disjointed databases. Only once a prospective client's business model and corporate attributes have been analyzed can a broker then decide whether to pursue the prospective client's business. Extensive man-hours are required to generate this information, and extensive man-hours are required to keep this information updated. Even then, due to inconsistencies in company names that exist throughout various data sources (e.g., multiple variants, incorrect spelling, subsidiaries and divisions, etc.), a broker may end up pursuing a prospect with which the broker already has an existing relationship. Existing customer relationship management software tools take blanket approaches that do not account for the brokers' or account executives' interests and do not account for the above-described problems with company name inconsistencies and nuances.

The inventors sought to develop a software-based automated tool to develop an understanding of a given broker's specific appetite and return, in real-time, a list of prospects that meet this appetite, including actionable information for deciding whether to pursue the prospect. In this way, a broker can instantly use this real-time information to make a decision on the viability of a prospect. Further, the inventors sought to perform client/company matching to alleviate the issues surrounding multiple name variants, corporate hierarchies, and incorrect spelling, which thus enables the broker to readily determine whether the broker already has an existing business relationship with the prospect or if there is some preexisting relationship (e.g., at a hierarchical level) that can be leveraged in engaging the new prospect.

SUMMARY OF ILLUSTRATIVE EMBODIMENTS

In one aspect, the present disclosure relates to automatically identifying key terms for performing Internet searches to identify prospective clients ("prospects") based upon attributes of a current set of clients along with, potentially, information regarding a requester's appetite for new business (e.g., desire to focus on particular lines of business, products, etc.). The key terms are isolated, in some embodiments, through performing web searches and web scraping of online information related to existing clients. In some embodiments, key terms are isolated through performing web searches and web scraping of online information relating to one or more example potential clients entered by a requestor.

In some implementations, prior to performing Internet searches, existing clients and/or example potential clients are categorized based upon organizational attributes such as, in some examples, industry, geographic location, and size. Searches, for example, may be performed by category of client to identify sets of key terms.

An initial set or sets of key terms, in some implementations, are filtered through performing a number of data analyses on the key terms. In some examples, key terms may be grouped thematically to identify related terms, reviewed across categories to promote those terms which are prevalent in only a particular client attribute category, root-reduced to remove redundancies in terms introduced through variances in stems (e.g., plurals, etc.), expanded to include synonyms of potential key terms, and/or re-weighted to reduce the impact of multiple key terms having a similar meaning (e.g., car, auto, automobile, vehicle).

In one aspect, a number of Internet searches are performed using the key terms identified to be related to existing clients and/or example desired clients to identify a number of web sites. The web sites may include, in some examples, home sites of prospective organizations, financial or business pages of prospective organizations, or social media pages of prospective organizations. In some embodiments, the web sites are automatically reviewed to confirm a site associated with each of the clients or example desired clients used to generate the key terms has been identified through the Internet searches. The key terms may be refined, for example, based upon the effectiveness of individual key terms in identifying a web site of the existing clients and/or example desired clients. Further to the example, the refined terms may be used in a follow-on number of Internet searches to identify additional web sites.

In one aspect, web sites obtained through the number of Internet searches applying key terms relevant to existing and/or desired clients are automatically reviewed to identify a number of prospective clients. The prospective clients, for example, may be identified through a commercial search engine. Using the prospective clients identified through key word searches, in some implementations, business information is identified related to each of the prospective clients. For example, names of potential clients may be fed into a financial or business-related online resource to obtain additional information regarding each prospect.

In one aspect, the prospective clients and business information are distilled to generate a final list of prospective clients. In some embodiments, redundant prospects are removed from the list. For example, through corporate hierarchy, mergers, or acquisitions, multiple prospects obtained through automated Internet searching may relate to the same entity. The prospective clients, in some embodiments, are cross-referenced against existing clients to identify any clients already entered into the system. Identification as an existing client, in some embodiments, does not lead to removal from the list. In some examples, the client may be an existing client in relation to a different line of business or product, or be a client of different users of a greater transactional system. In these circumstances, it may be beneficial to present the prospective client to the requestor for review.

In some implementations, a final list of prospective clients is presented to the requestor in real-time in a graphical user interface. For example, an initial list of information may be presented, with the capability to drill down or follow the prospective client's URL for additional information. Alternatively, the list of prospective clients may be emailed to the requestor or otherwise distributed to the requestor.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 4A is a screen shot of an example user interface for presenting prospect information to a user;

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Figure 1A:
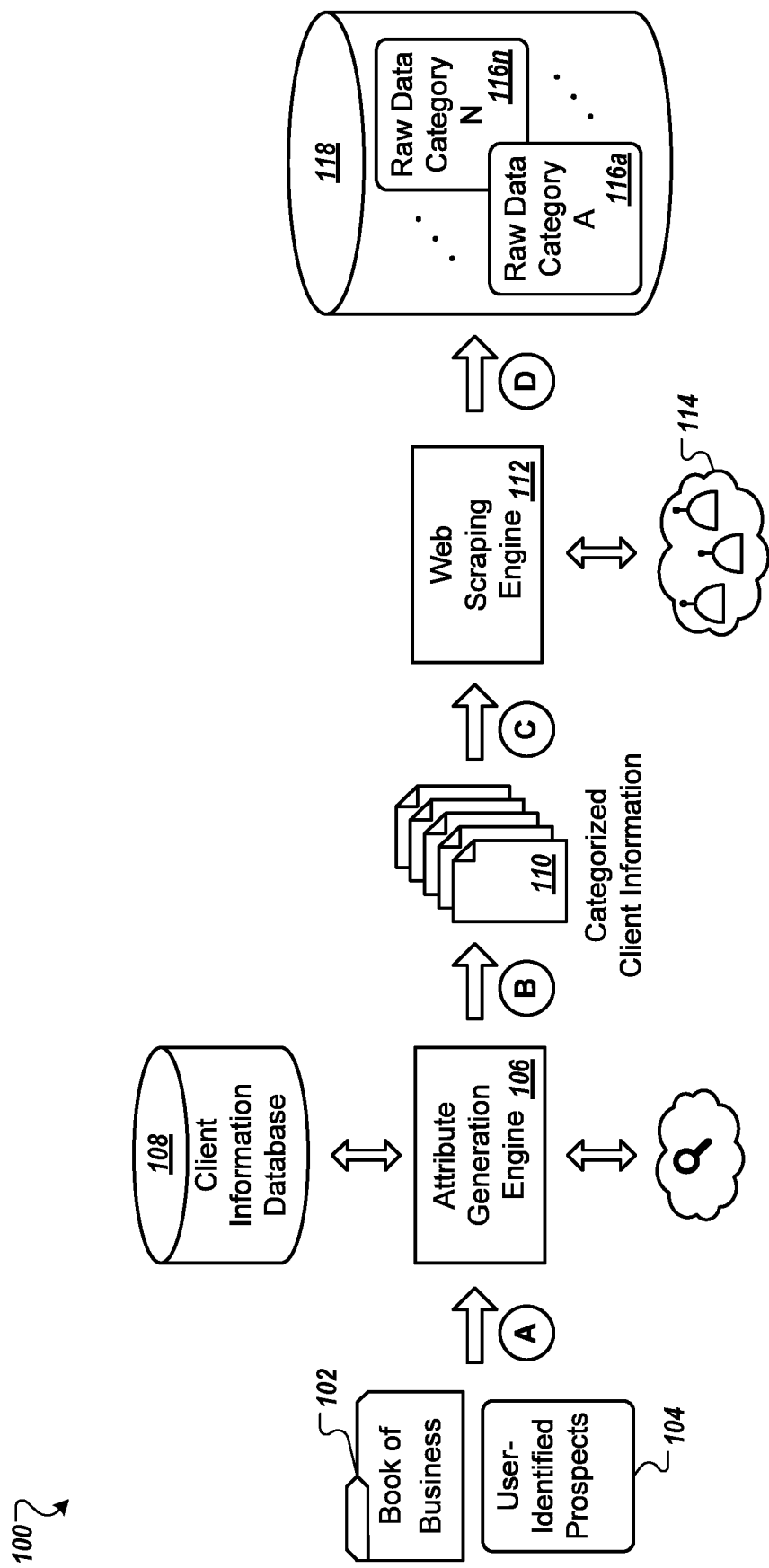
FIG. 1A is a block diagram of an example operational flow for automated analysis of a professional's existing book of business.
Figure 1B:
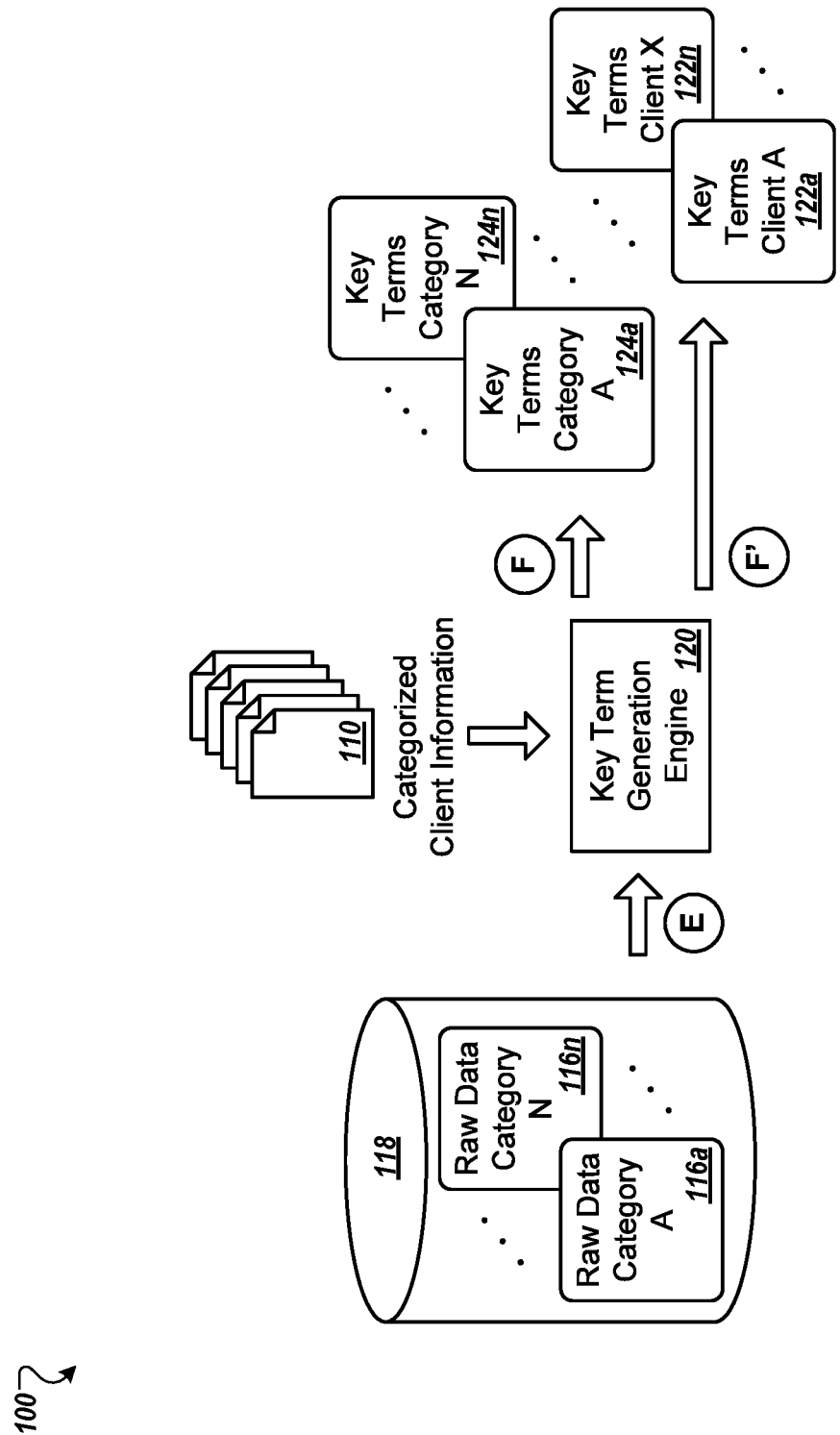
FIG. 1B is a block diagram of an example operational flow for automatically generating key terms related to the professional's existing book of business.

FIGS. 1A-1B illustrate an example operational flow 100 for automated analysis of a professional's existing book of business to glean information relevant in identifying prospective clients. The operational flow develops sets of raw data associated with or describing groups of existing clients within a professional's existing book of business. The raw data can later be analyzed to determine key terms useful in automatically searching for prospective clients sharing similar attributes with clients within the professional's current book of business.

Since, in a general sense, a professional working with a collection of clients typically caters to and/or develops products for clients sharing some basic attributes, the professional will tend to seek prospective business clients also having these core attributes. For this reason, in automatically identifying prospective clients on behalf of the professional, the operational flow begins with obtaining the professional's current book of business 102 (e.g., list of clients). It may additionally be useful to obtain identification of one or more user-identified prospects 104 (e.g., desired clients), for example if the professional is seeking to branch beyond a current core business model.

The list of clients 102 may be obtained from an existing file or database (e.g., stored on a local memory or on a server). For example, the list of clients 102 may be provided in a comma-separated values (CSV) file or spreadsheet. In another example, at least a portion of the list of clients 102 may be obtained through the professional entering the list of clients 102 at a user interface.

To determine similar clients within the overall book of business 102, an attribute generation engine 106, in some implementations, analyzes the book of business 102 and/or user identified prospects 104 and provides, at step B, categorized client information 110, grouped by common attributes. For example, the book of business 102 may include a variety of clients, each corresponding to a particular aspect of the professional's business appetite.

In some implementations, the attribute generation engine 106 analyzes the list of clients 102, 104 and groups the list of clients 102, 104 into particular categories (e.g., by geography, industry, line or business, product type, revenue range, maturity, etc.). In some embodiments, sets of groupings are generated (e.g., group "A" including clients by geography, group "B" including clients by industry, etc.), where the sets include overlapping clients from the list of clients 102, 104. The groupings, in one example, represent the most common shared attributes within the professional's book of business 102.

To categorize the list of clients, in some implementations, the attribute generation engine 106 first identifies attributes associated with each of the list of clients 102, 104. In one example, the spreadsheet or CSV file supplied by the user may include client attributes in addition to the client names. In another example, the attribute generation engine may cross-reference each client identified in the list of clients in one or more client databases 108 to obtain attributes associated with each client. The client information database 108, for example, may include clients within an insurance exchange environment which may consist of both the clients within the book of business 102 as well as additional prospective clients 104 managed by other professionals within the insurance exchange environment. In the example where the list of clients 102, 104 includes one or more user-identified prospects 104, the attribute generation engine 106 may search public sources (e.g., Internet-accessible information, etc.) for attributes regarding the listed prospect 104. In some illustrative examples, the attribute generation engine 106 may query one or more of the following: hoovers.Com® by Hoover's Inc. of Austin, Tex., Google® Finance by Google, Inc. of Mountain View, Calif., or Yahoo® Finance by Yahoo, Inc. of Sunnyvale, Calif. to derive financial attributes; and/or LinkedIn® by LinkedIn Corporation of Mountain View, Calif. or Wikipedia® by the Wikipedia Foundation to derive general business information.

If, instead, the professional begins the process by providing only those clients within his or her book of business 102 relevant to a particular strategic (underdeveloped) business appetite, categorization may be skipped. Whether categorization is performed may depend in part upon the number of clients 102, 104 provided in step A. If the number of clients is less than a threshold number of clients, for example, it may not be useful to create smaller groupings based upon client attributes.

In some implementations, the categorized client information 110 generated by the attribute generation engine 106, at step C, is supplied to a web scraping engine 112 to locate a collection of web data related to the clients 102, 104 identified within each client attribute category 110. The web scraping engine 112, for example, may perform web scraping on a number of web sites and/or web pages identified by the web scraping engine 112 through web searches targeting each client of the subset of the client list 102, 104 in each client attribute category 110 to produce sets of raw data 116a-n corresponding to each client attribute category 110. Web scraping may alleviate the data quality and integrity issues that would normally be associated with a manual search and retrieval of data by a broker. Data can be extracted and verified through automated algorithms in real time, allowing more data points (e.g., URLs, etc.) to be considered than possible using a manual search.

Web scraping (also referred to as web harvesting) involves extracting data from web pages and/or web sites. The data can include, in some examples, HTML code, metadata, text derived from natural language processing of image-based web content, and text-based content displayed to web pages. Typically, a bot or web crawler is programmed to copy information from web pages or websites to a storage location, such as a database or spreadsheet. A bot or web crawler is a software application designed to execute automated scripts over the Internet 114. Particularly in the circumstance of a web crawler, this includes recursively collecting information from pages of a website beginning with the root (main) web page. The web scraping engine 112, for example, may execute a bot or web crawler to collect information from a number of Internet sources.

In identifying the sources for web scraping, the web scraping engine 112 may access client identification information (e.g., client name as well as, where helpful in discerning companies having similar names, additional demographic information such as geographic region, address, telephone number, etc.) from the categorized client information 110 and/or the client information database 108 for use in determining web sites and/or web pages to scrape. For example, the web scraping engine 112 may query a commercial search engine (e.g., Bing from Microsoft Corporation or Google Search from Google Inc.) using the client identification information to identify the client home page and, additionally, one or more top results not matching the home page (e.g., not including the same root www.companyname.com string in the uniform resource locator (URL)). The web scraping engine 112 may further target general business news resources (e.g., Bloomberg.com by Bloomberg L.P. of New York, N.Y., Wall Street Journal by Dow Jones & Company, Inc. of New York, N.Y., reuters.com by Reuters of London, UK), industry business news resources associated with a particular industry category, or social media feeds provided by the client itself (e.g., Facebook® by Facebook, Inc. of Menlo Park, Calif., Twitter® by Twitter, Inc. of San Francisco, Calif., LinkedIn®, etc.).

The web sources are identified by the web scraping engine 112, in some implementations, based in part by a client category 110 including geographical region and/or the geographical region matching the clients 102, 104 provided in a particular client category 110. For example, the web scraping engine 112 may use the commercial web search engine google.com to search U.S.-based client information, and google.co.uk to search UK-based client information. In another example, the web scraping engine 112 may access user preference settings, identifying preferred search engines and web sites for performing web scraping. The user preference settings, for example, may be supplied by the user at the time of entering the clients 102, 104. In another example, a user profile may include previously stored preference settings. The preference settings, in some examples, may include preferred geographic region(s), preferred search engine(s), preferred news source(s), and/or preferred social media feed(s). The web scraping engine 112 may use the preference settings in addition to or in lieu of default settings for identifying search engines and web sites.

The bots or web crawlers designed for use by the web scraping engine 112, in some implementations, are programmed to target particular information based on the selected web source. For example, when collecting general business information from the site finance.yahoo.com, the web crawling engine 112 may designate a bot designed to target information in the profile tab under header "description". Alternatively, the bots or web crawlers may collect all natural language presented upon a scraped web page.

The web scraping engine 112, in some embodiments, stores data scraped by the bots or web crawlers to a raw data store 118 in a database, spreadsheet, or other indexed form. The raw data 116a-n, for example, may be identified by client category 110 as well as client identification 102, 104.

In a broadly reaching web scrape, for each client 102, 104 in each client category 110, thousands of words, phrases, files, images, and other data may be retrieved by the bots or web crawlers and stored to the raw data store 118. However, not all of the scraped information is useful in identifying key terms descriptive of individual clients in the list of clients 102, 104 or, in other words, key terms useful in locating prospects. For this reason, turning to FIG. 1B, in some implementations a key term generation engine 120 accesses the raw data store 118 at step E to distill the raw data results 116*a-n* from the web scraping engine 112 into a set of key terms. The key term generation engine 120 is designed to mine the raw data store 118 and analyze the data 116*a-n* to identify terms that are important to, or define, each client 102, 104.

The key term generation engine 120, in some implementations, applies a number of data mining techniques to derive one or more sets of key terms 122*a-n*, 124*a-n*, from the categorized client information 110. Data mining techniques may involve artificial intelligence, statistics, and/or machine learning to extract useful patterns from large collections of data.

Key terms 124*a-n* which are frequent across multiple client categories 110 may be deemed to have a lower usefulness compared with key terms 124*a-n* that appear frequently within a particular client category 110 but otherwise appear infrequently across the corpus of key terms 124*a-n* of all of client categories 110. For example, "oil" is a key term specific to the energy industry category, while "manufacturer" may appear across a variety of industries. For this reason, the key term generation engine 120, in some implementations, uses term frequency-inverse document frequency ("tf-idf") techniques to isolate useful key terms from the corpus of natural language-based data 116*a-n* stored in the raw data store 118. The tf-idf applies a weighting factor in textual data mining which increases proportionally to the number of times a term appears within a first document or collection of terms, but decreases by the frequency of the term as used in a more general corpus of textual data. This may allow the key term generation engine 120 to isolate key terms 124*a-n* relevant to a particular client category 110.

The key term generation engine 120, in some implementations, additionally expands and refines candidate key terms. In one example, synonyms or related terms may be added to the isolated key terms 122, 124 initially produced by the key term generation engine 120. In another example, each key term 122, 124 may be reduced to a root component to discard redundancies (e.g., airplanes reduced to airplane).

To expand on the identified key terms 122, 124, in some implementations, the key term generation engine 120 uses word embedding to map key terms (e.g., words and phrases) to vectors of real numbers. In this way, key terms 122, 124 can be mathematically analyzed for various purposes, such as determining relationships between words and finding words that are similar. Word vectors are positioned in vector space such that words that share common contexts in the corpus are located in close proximity to one another. For example, from a list of keywords like "aviation", "flight", "shark", and "airport", word embedding leads to an understanding that "shark" is least like the others. In another example, a keyword word "oil" can be analysed to produce additional keywords "gas", "refining", "drilling", etc. The key term generation engine 120 may use a shallow neural network to generate the vector mapping.

To increase the advantage of processing with both tf-idf and word embedding, the key term generation engine 120, in some implementations, removes words and/or phrases with low tf-idf usefulness as key term candidates, while maintaining usage counts for the removed words/phrases so that the word embedding output can be biased by common words. Through this process, the word embedding can be used to remove key terms which are unrelated to the majority. At step F, the final sets of key terms 124*a-n* for each client category are provided by the key term generation engine 120. The final sets of key terms 124*a-n*, for example, may be stored within a local data store for use in identifying prospects.

Additionally, in some implementations, the key term generation engine 120, at step F', also arranges the key terms 124*a-n* by individual client 102, 104 to track which of the key terms were generated based upon which client 102, 104. In this manner, for example, individual clients' key terms 122*a-n* may be recombined without performing an additional web scraping by the web scraping engine 112. Further, as discussed in relation to FIG. 3A, the key terms 122*a-n* associated with a particular client 102, 104 may be verified prior to use in identifying prospects.

Figure 2:
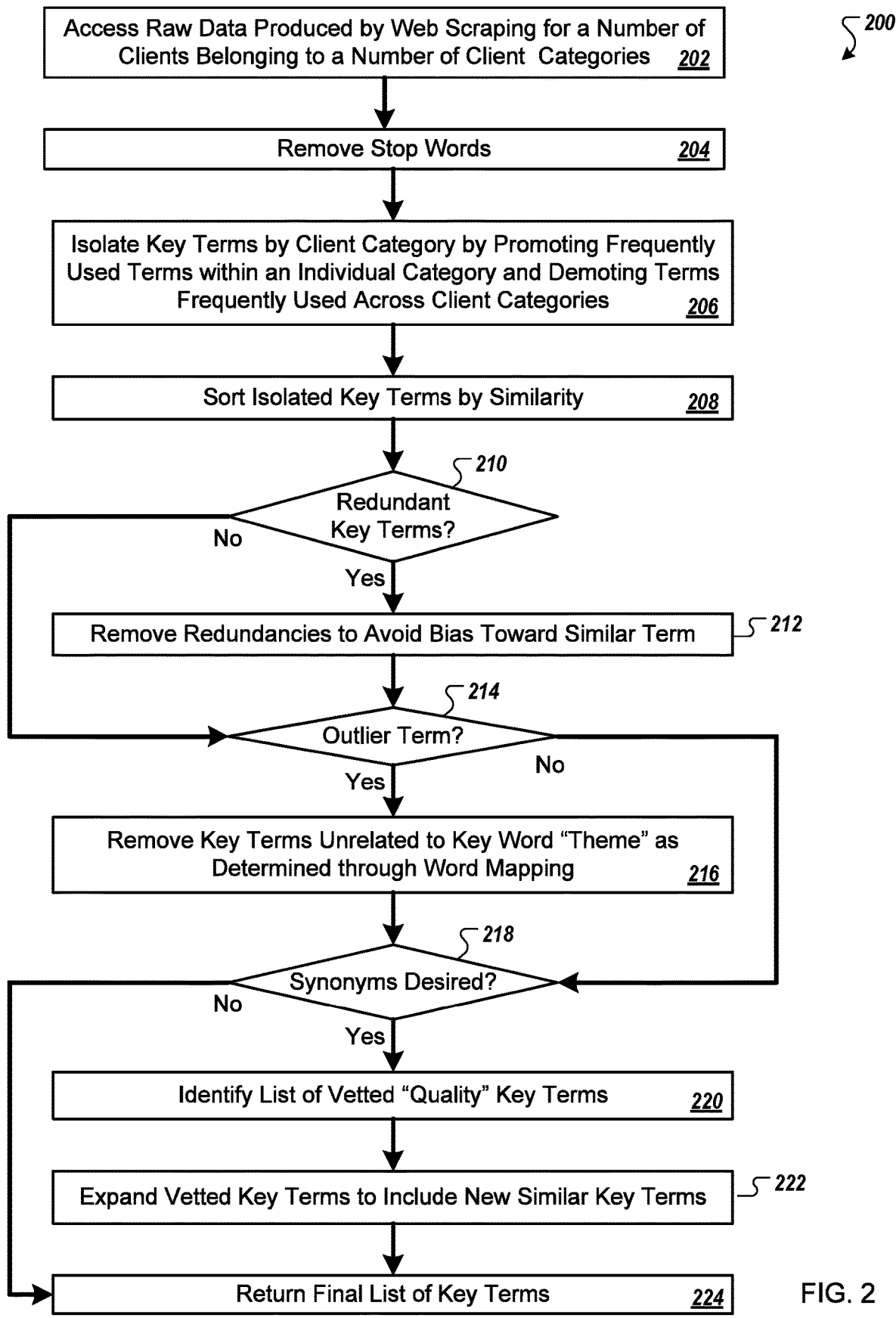
FIG. 2 is a flow chart of an example method for identifying key terms based upon the results of web scraping.

Turning to FIG. 2, a flow chart of an example method 200 for identifying key terms based upon the results of web scraping is illustrated. The method 200, for example, may be performed by the key term generation engine 120.

The method 200, in some implementations, begins with accessing raw data produced by web scraping (202). The web scraping data represents a number of current and/or ideal clients. The data may be structured into a number of client categories. The web scraping engine 112 of FIG. 1A, for example, may have generated the raw data 116*a-n*.

In some implementations, stop words are removed (204). As an initial cut through the raw data, for example, commonly used language, such as, in some examples, frequently used verbs, adverbs, prepositions, and pronouns, may be removed to reduce the size of the raw data analyzed and/or to increase validity of language processing results. In one example, a set of stop words may be supplied to the key term generation engine 120 for filtering the categorized raw data 116*a-n*. The stop words may be based, in part, upon client demographic information. For example, different stop words may be used for different geographies to take local language into account. The stop words may alternatively be maintained to enhance natural language processing of phrases which may be used as key terms.

In some implementations, key terms are isolated by client category by promoting frequently used terms within an individual category and demoting terms frequently used across client categories (206). As discussed above in relation to FIG. 1B, for example, the key term generation engine 120 may apply tf-idf techniques to isolate useful key terms 124*a-n* from the corpus of natural language-based data 116*a-n* stored in the raw data store 118.

In some implementations, the isolated key terms are sorted within each client category by similarity (208). For example, the key term generation engine 120 of FIG. 1B may apply word mapping to isolated key terms to identify similar key terms.

If redundant key terms are identified (210), in some implementations, the redundancies are removed to avoid bias toward a similar term (212). In one example, the terms "vehicle", "vehicles", and "vehicular" may be reduced to the single term "vehicle."

If an outlier term is identified (214), in some implementations, the outlier term is removed (216). Relevant key terms for a particular client category may follow a particular theme. For example, in the automotive industry, terms like automobile, vehicle, car, truck, dealership, motor, manufacturing, and "crash rating" follow the same general theme, while a term like "scandal" may be an outlier not indicative of the client category but instead indicative of particular hot button news regarding a particular seed client.

To produce a meaningful array of key terms for searching for additional clients similar to the current book of business, in some implementations, isolated key terms are expanded using synonyms. If synonym generation is desired (218), a list of vetted "quality" key terms, in some implementations, is identified (220). The quality key terms, for example, may be identified through user confirmation. For example, through a user interface, the user may approve of a subset of the key terms 124a-n isolated by the key term generation engine 120. In another example, key terms may be vetted as fitting well within a key term "theme." If word mapping, for example, identifies a key term as being a strong match, thematically, with other key terms, the key term may be identified as a candidate for expansion to similar key terms. For example, the key term may be used to identify synonyms (e.g., car and automobile are synonyms of vehicle). However, since bias could occur, in other embodiments the isolated key terms may be used without expanding to similar key terms.

After the key terms have been isolated and massaged through redundancy removal, outlier removal, and/or synonym expansion, in some implementations, a final list of key terms is returned (224). For example, as shown in FIGS. 3A-3C, an operational flow 300 illustrates example stages of processing for generating a final list or final sets of key terms 302a-n and using the key terms in identifying prospects.

Figure 3A:
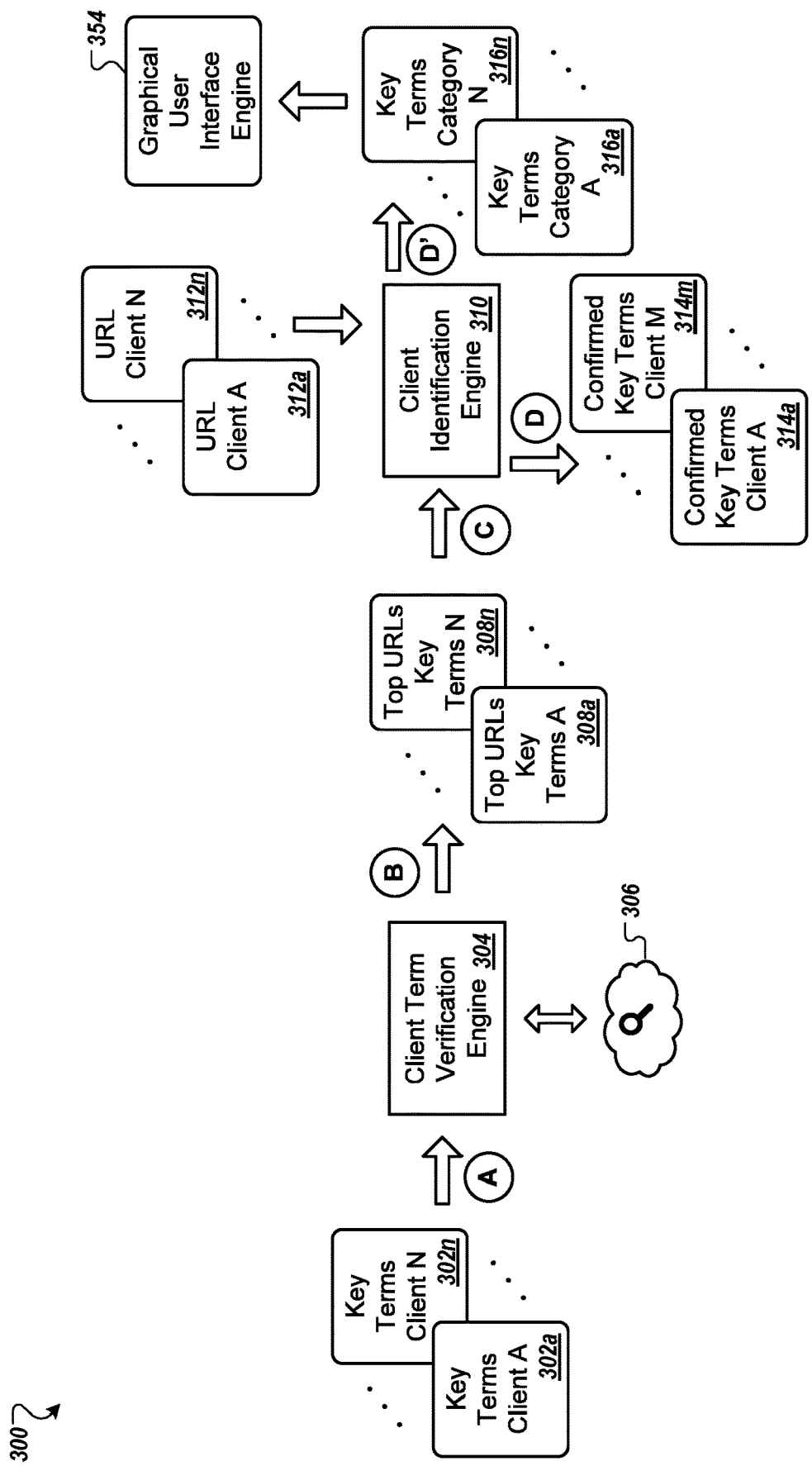
FIG. 3A is a block diagram of an example operational flow for identifying a list of URLs based upon key terms.
Figure 3B:
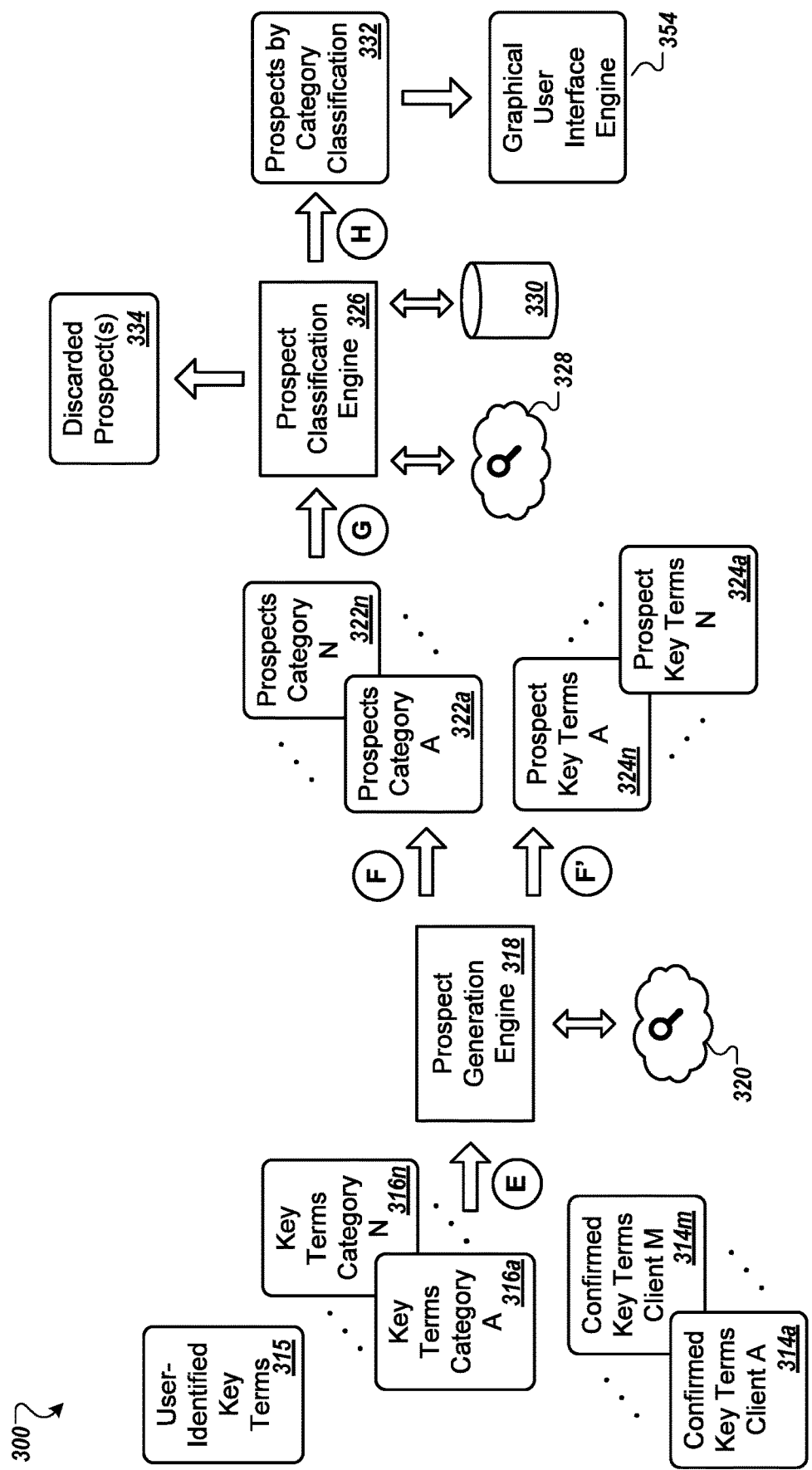
FIG. 3B is a block diagram of an example operational flow for identifying a list of prospects based upon key terms.
Figure 3C:
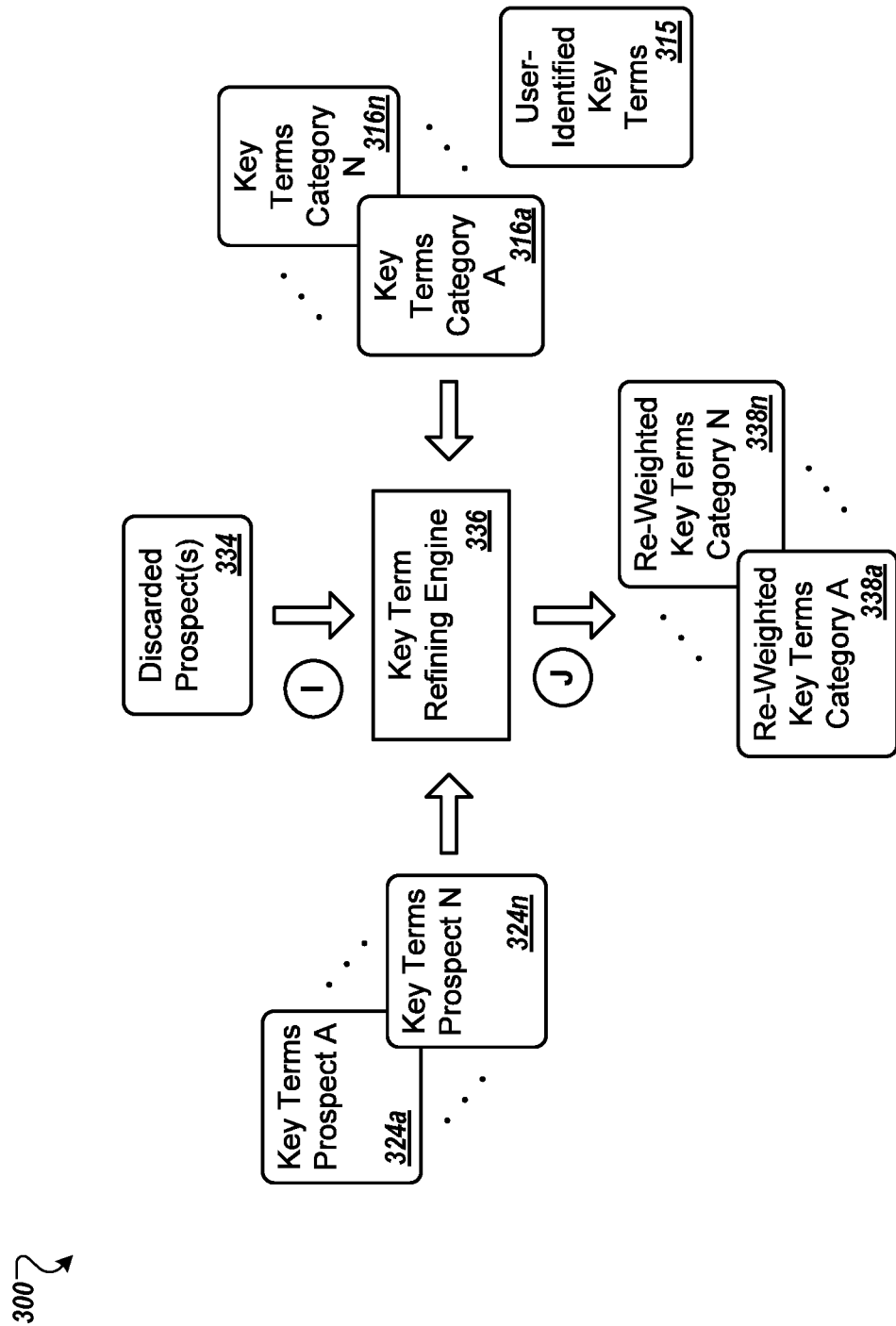
FIG. 3C is a block diagram of an example operational flow for refining key terms based upon feedback identifying one or more mismatched prospects.

Turning to FIG. 3A, in some implementations, the final list or final sets of key terms 302a-n is provided, at step A, to a client term verification engine 304 for identifying a list or sets of URLs 308a-n based upon the key terms 302a-n on a per-client basis. The client term verification engine 304, for example, may provide the key terms 302a-n, client by client, to a commercial search engine 306, such as Bing or Google to determine a set of top URLs per client 308a-n. The search terms, for example, may be supplied recursively. For example, each of a set of known synonyms may be combined with additional key terms to perform searches. Further, searches may be done combining one or more "thematically" common terms with one or more other terms not included within the theme. In the power supply industry, for example, themes may include a source theme (e.g., natural gas, electricity, electric, solar, geothermal, nuclear, etc.) as well as an infrastructure theme (e.g., grid, cells, generator, etc.). If terms have been weighted, higher weighted terms may be combined with different sets of lower weighted terms. The client term verification engine 304 may provide the top URLs 308a-n obtained from the internet search to a client identification engine 310 at step B.

At step C, in some implementations, the client identification engine 310 verifies that the key terms for each client 308a-n will consistently return a result including that client 102, 104. The client identification engine 310 may review the URLs of top search results (e.g., top 10, 20, 50, etc.) to identify each client URL 312a-n (or version thereof, if the main web page is not returned but another web page of the corporate web site is listed within the results). The client URL 312a-n, for example, may have been identified in client information derived from the book of business 102 and/or the client information database 108 of FIG. 1A. For example, the categorized client information 110 may include client URL information 312a-n.

The client identification engine 310, at step D, supplies lists of confirmed key terms 312a-m for clients A through M, which may be fewer clients than an initial client set A through N. Further, at step D', if categorization is being applied, the client identification engine 310 may arrange the key terms by category 316a-316n. The key terms confirmed to generate a result of the client they are associated with may be used in generating a list of prospects similar to these clients.

In some implementations, a user is presented with a portion of the key terms to confirm their appropriateness. The user, for example, may be provided with the option of review and confirming, and even adding to key terms prior to running a search. For example, as illustrated in FIG. 3A, a graphical user interface engine 354 may present an interactive user interface to a user to confirm appropriateness of a portion of the key terms 316. Conversely, the key terms 302 may instead be manually vetted prior to the client term verification engine 304 validating that the key terms result in locating the original seed clients.

Turning to FIG. 3B, in some implementations, a prospect generation engine 318 receives the key terms 314a-m and/or 316a-n (possibly refined by discarding one or more clients) at step E for identifying a list of prospects based upon the key terms 314a-m and/or 316a-n. In some embodiments, additional user-identified key terms 315 are provided, for example during a verification process to confirm appropriate key terms and to present additional key terms. Alternatively, at the beginning of the process, the user may supply one or more key terms that the user deems applicable to the search for prospects. The user-identified key terms 315 may be categorized using one or more of the same categories as used in categorizing the clients, as described in relation to FIG. 3A. The prospects may be identified, for example, by querying one or more web sites using the key terms 314a-m and/or 316a-n. The key terms 314a-m, 315, and/or 316a-n, for example, may be provided to a commercial search engine 320, such as Bing or Google.

In some implementations, the prospect generation engine 318 identifies query results supplied by the commercial search engine 320 in response to a query including at least a subset of the key terms 314a-m, 315, and/or 316a-n. The subset, for example, may include those key terms included in a particular "theme" as identified through word mapping. In another example, all key terms may be provided to the search engine for conducting the search (e.g., in the circumstance of searching within a single category). The prospect generation engine 318 may review the URLs of top search results (e.g., top 10, 20, 50, etc.) to identify corporate web sites. In one example, to narrow the results to corporate sites, the prospect generation engine 318 may discard URLs obviously not related to companies (e.g., .org, .gov, etc.). Additionally, the prospect generation engine 318 may discard URLs belonging to major news sites (e.g., Reuters, Forbes, Wall Street Journal, etc.) and other informational sites (e.g., Wikipedia, URLs containing terms such as "magazine", "blog", "tribune", "news", etc.). In addition to the key terms 314a-m, 315, and/or 316a-n, to zero in on corporate web sites, the prospect generation engine 318 may add search terms such as "company", "headquarters", "corporation", "incorporated", and/or "official site."

At step F, in some implementations, the prospect generation engine 318 generates a number of identified prospects in each client category 322a-n. For each prospect 322a-n, for example, the prospect generation engine 318 may include a prospect name as well as at least one prospect URL (e.g., corporate website).

Further, at step F', in some implementations, the prospect generation engine 318 logs which key terms were found to be relevant to each prospect in a list of prospect key terms 324a-n. For example, to later analyze the utility of individual key terms in generating quality prospects, the prospect generation engine 318 may store prospect key terms relevant in identifying each prospect. 324a-n. The terms, further, may be classified by each prospect category.

In some implementations, the lists of prospects 322a-n, at step G, are provided to a prospect classification engine 326. The prospect classification engine 326, for example, may conduct additional searches (e.g., using the commercial search engine 320 or another search engine 328) to classify identified prospects by one or more classifications such as, in some examples, corporate size, geographic region, maturity, industry, etc. In some illustrative examples, the prospect classification engine 326 may query one or more of the following: hoovers.Com® by Hoover's Inc. of Austin, Tex., Google® Finance by Google, Inc. of Mountain View, Calif., or Yahoo® Finance by Yahoo, Inc. of Sunnyvale, Calif. to derive financial attributes; and/or LinkedIn® by LinkedIn Corporation of Mountain View, Calif. or Wikipedia® by the Wikipedia Foundation to derive general business information.

In some embodiments, the prospect classification engine 326 indexes a data base 330 or other data store of stored information regarding major corporations to obtain business information regarding each identified prospect 322. The business information in the data base 330 may be stored as data associated with each prospect, for example to later present to the requesting user as additional information to consider when determining which prospect(s) to contact regarding a transaction. In a particular example, any prospects not identified within the data base 330 may be located through searching via the search engine 328.

In some implementations, to classify the prospects, terms mined from the web site of a particular prospect or the business information associated with the prospective client may be verified against the key words used to identify the prospect 324a-n. For example, using word embedding, the prospect classification engine 326 may map both key terms (e.g., words and phrases) mined from the prospect web page and/or business information and the key terms used to identify the prospect to vectors of real numbers. The prospect classification engine 326 may use a shallow neural network to generate the vector mapping. Based upon a similarity analysis of the key terms 316a-n (and/or confirmed key terms 314a-m) and 315 provided at step E to the key terms mined from the prospect web site and/or business information 324a-n, the prospect classification engine 326 can classify the prospect within the appropriate client category.

The prospect classification engine 326 provides, at step H, groupings of prospect by category classification 332. The classification may be a single classification (e.g., one industry vs. another industry), a multi-level classification (e.g., by industry as well as geography) or by multiple classifications (e.g., a first grouping by industry, and a second grouping by geography).

In some implementations, the initial prospect list is presented to a user for confirmation purposes. For example, the user may confirm that the prospects are appropriately classified and generally represent quality selections based upon the initially-provided book of business 102 (FIG. 1A). During review, the user may be provided the opportunity to flag one or more of the identified prospects as being "bad" matches 334. The results of the user interaction can be used to better refine the algorithms through machine learning by applying the "bad" results to analysis of past searching.

In other implementations, based upon vector mapping, the prospect classification engine 326 may disqualify one or more prospects as being bad matches 334 to the key terms in light of classification matching. If a particular prospect is flagged as "good" or "bad," given a score along a scale (e.g., zero to ten), or ranked in some other manner, the weights associated with keywords used to generate the particular prospect, in some embodiments, are updated accordingly.

As illustrated in FIG. 3C, in some implementations, the one or more bad matches 334 (e.g., discarded prospects) are provided, at step I, to a key term refining engine 336. The key term refining engine 336, in some embodiments, alters weights associated with one or more key terms 324a-n used to generate the prospect, based upon a matching between the key terms 324a-n used to identify prospects in comparison to the key term matches (or relative strength of key term matches) within the list of corresponding key terms identified in relation to the "bad" prospect(s) 334.

A Bayesian approach may be used to disregard keywords that return inaccurate prospects 334. For example, the weights of the keywords used in identifying the "bad" prospect(s) 334 are decreased. If a particular client, further, is identified as having contributed heavily to the generation of the bad prospect(s) 334, the key terms 112a-n associated with the particular client (e.g., generated as described in relation to FIG. 1B) may all be removed from further use. The key term refining engine, at step J, provides sets of re-weighted key terms by category 338a-n. The re-weighted key terms 338a-n, in some examples, may be used in a recursive search or in additional searches to identify new prospects.

Once a list of prospects is generated, further classification of the prospects may be performed. For example, a machine learning classification technique may be used to classify each prospect into specific sectors. In illustration, the prospects found in an energy industry search can be classified as downstream, midstream, and upstream companies. Any other desired method may be used to classify the prospects to aid the user in understanding the prospects in the list and identifying relevant prospects. For example, the prospects may be classified by geographic location, size, or revenue.

The processes of generating keywords and prospects may also be performed recursively. For example, once a first list of prospects is generated, those prospects may be analyzed for additional keywords and additional prospects (e.g., starting at step C of FIG. 1A using derived prospect information). As another example, if, in searching the relevant keywords, a trade association is found as a prospect, then members of that trade association may be used as prospects, or members of that trade association may be further analyzed for additional keywords and additional prospects.

Figure 3D:
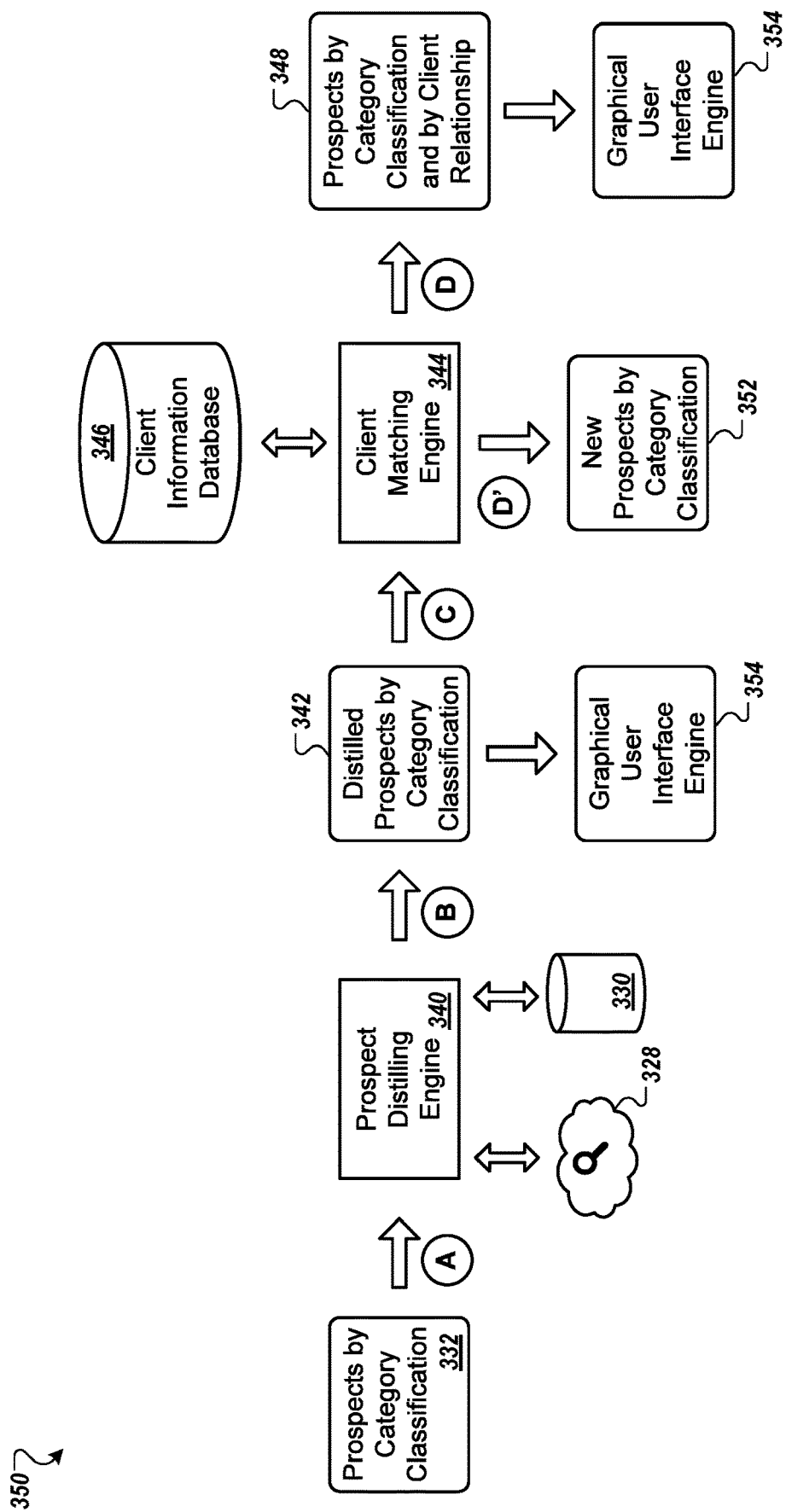
FIG. 3D is a block diagram of an example operational flow for removing duplicate entries from a list of corporate identities and matching corporate entities from the list to existing clients.

One issue that arises from the voluminous results from a search engine is how to identify and group potential prospects that have relationships with others in a hierarchical corporate structure. In some examples, mergers, acquisitions, partnerships, geographic variations, misspellings, and commonly used name variations (e.g., IBM vs. International Business Machines), etc. can muddy interpretation of discrete prospects, potentially leading to duplicate information that generally describes a same prospect. Turning to FIG. 3D, the prospects by category classification 332, in some implementations, are provided to a client matching operational flow 350 for identification of redundant matches and for matching prospects with existing client information.

In some implementations, the prospect distilling engine 340 receives the prospects by category classification 332 at step A. For example, the prospects may be supplied by the prospect classification engine 326 prior to using the prospects 332 for key term refining by the key term refining engine 336, as described in relation to FIG. 3C.

The prospect distilling engine 340, in some embodiments, distills the list of prospects to remove any duplicates (e.g., due to misspellings or other variations) and to present the prospect identification in the simplest terms possible while still retaining information for unique identification of the prospect.

The prospect distilling engine 340 may use a fuzzy name matching technique to match names that are literally different but have a high probability of actually referring to the same word or entity. For example, the name "Microsoft" in one instance and its typographical misspelling "Microsoft" in a separate instance have a very high likelihood of being matched. Depending on the strength of the fuzzy string matching technique desired and the availability of company name databases, companies can also be matched with their nicknames, acronyms, ticker symbols, international variants, etc. For example, the prospect distilling engine 340 may conduct one or more searches (e.g., Internet searches using the search engine(s) 320, 328 and/or business information searches in the data store 330 as described in relation to FIG. 3B, etc.) to identify additional terms used to refer to a same prospect. The fuzzy name matching technique may identify similarities between a name based upon one or more of substitution, insertion, deletion, and transposition of letters within the name. Each operation, in one example, may be weighted the same. For example, the fuzzy name matching technique may weight substitution similar to addition. In another example, the weights may be adjusted based upon the operation being used to adjust the name to conform to a preexisting name. The confidence of the prospect distilling engine 340 in finding a match using fuzzy name matching techniques may further be weighted based upon a number of operations applied to conform the name. For example, a much higher confidence rating may be applied to a name which only required a single operation to one which required multiple operations to conform to a given prospect name.

Alternatively, or in addition to fuzzy name matching, the prospect distilling engine 340 may enter each prospect name into the commercial search engine 328 (or 320 of FIG. 3B) to locate the homepage for the prospect company. If the same homepage is found for different prospect names, then there is a high probability that the prospect names refer to the same company or parent company. Company misspellings, typos, and spelling variations can easily be corrected for by comparing similar URLs. Additionally, through the analysis of similar URLs, subsidiaries can easily be matched, and company name changes (e.g., as a result of a merger or acquisition) are reflected in real-time because URLs are typically updated far faster than company registrar databases. While simple string comparisons can also perform this task, they are computationally expensive and all possible string differences are hard to cache in storage (to speed up computation).

At step B, in some implementations, the prospect distilling engine 340 provides a set of distilled prospect names by category classification 342 to a client matching engine 344. The prospect names may include fewer names than the original (e.g., due to determining that two separate strings were equivalent to the same prospect name). However, the prospect names may include a greater number of names than the original set (e.g., based upon supplying nicknames, ticker names, acquiring company name (e.g., based upon a web site URL match), or other demographic information matching with additional terms sufficient to uniquely identify a prospect.

The sets of distilled prospect names by category classification, at step C, are provided to a client matching engine to determine whether any of the identified prospects are already clients. Alternatively, the prospects by category classification 332 may be provided directly to the client matching engine 344 without distilling using the prospect distilling engine 340. In one example, a user may confirm a set of prospects (332 or 342) prior to the set (or a subset thereof) being provided to the client matching engine 344. The prospect, in one example, may be a client of the user. In another example, the prospect may be a client of the organization the user belongs to (e.g., a broker of a brokerage firm) or otherwise have a relationship within the system (e.g., a former prospect the user previously contacted without resulting in a transaction).

Figure 4B:
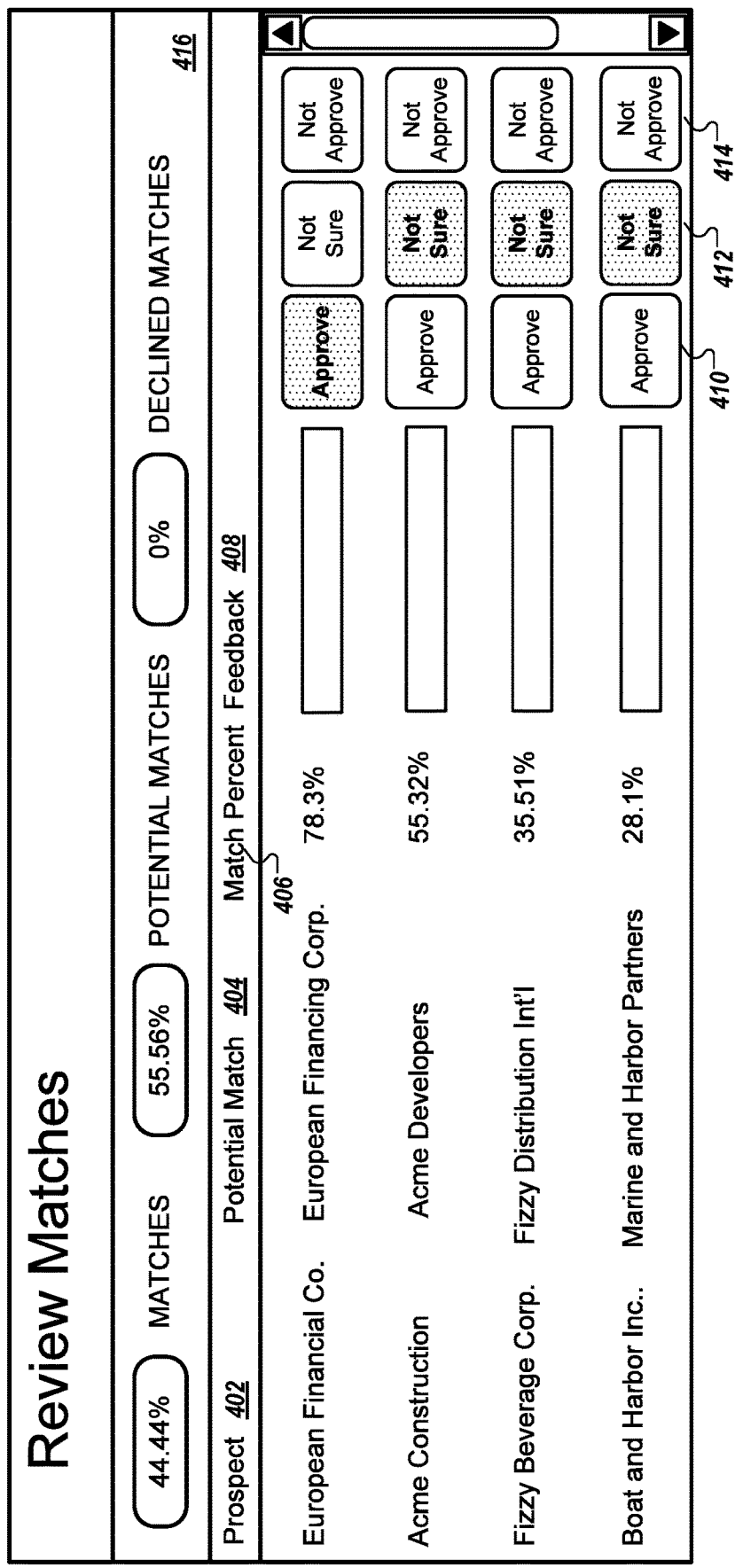
FIG. 4B is a screen shot of an example user interface for user intervention in confirming matches between similar prospect identities.

In some implementations, the prospect distilling engine 340 or client matching engine 344 requests user feedback in ensuring matches between entity names. For example, the prospect distilling engine or client matching engine 344 may use a machine learning model to enhance its abilities in matching similar names to a same client. The user may be presented with a graphical user interface for providing feedback regarding matches, as illustrated by graphical user interface engine 354 of FIG. 3D. Turning to FIG. 4B, for example, a screen shot 450 illustrates an example user interface for approving or disapproving automated matches between client names. The proposed matches, for example, may be presented to the user if they are under a threshold match confidence.

As illustrated in FIG. 4B, the user is presented with a list of potential matches to review, each match including a prospective client name 402, a potentially matching prospective client (or current client) name 404, and a percentage match 406 representing system confidence in the match. For each potential match, the user may select one of three controls: approve 410, not sure 412, or not approve 414. While the user is making these selections, in some implementations, a status bar 416 tracks percentage of potential matches in each category 410, 412, 414 (e.g., matches 44.4%, potential matches 55.56%, declined matches 0%). The information in the status bar 416, for example, may be indicative of relative success of the prospect distilling engine 340 or client matching engine 344 in identifying appropriate matches.

Further, in some embodiments, a feedback field 408 is provided for the user to enter feedback regarding the potential match. In one example, the feedback may be reviewed by data scientists in refining the machine learning model and/or matching algorithms to better provide matches. In another example, the feedback fields 408 may be useful to the user down the road in reviewing potential matches. For example, the user may be supplied with a copy of the entries illustrated in the screen shot 450 or otherwise be given the opportunity to save a copy of the information (e.g., using a download control). The user, in this case, may use the feedback fields 408 to maintain "notes to self" regarding the presented pair of prospects.

Although not illustrated, in some implementations additional matching information may be presented to enable the user to ensure an appropriate match, such as an address or geographic region shared by the potential matches, an industry shared by the potential matches, or other matching demographic information.

Large datasets, such as company names existing in a billing system, can be pre-generated such that analyses and comparisons are extremely fast. In this way, the distilled sets of prospects 342 can be compared to an existing client information database 346 to determine whether such companies are existing clients, related to existing clients (e.g., through merger, acquisition, and/or hierarchy), or are known (e.g., previously contacted) prospects. Thus, the client matching engine 344 accepts the sets of distilled prospects 342, cross-references the prospects 342 within the client information database 346 using a series of queries, and associates any identified prospects by client relationship in step D as prospects by category classification and by client relationship 348. The client relationship, as discussed above, can include a client of the user, a client of the user's organization, a client within the greater system (e.g., business information already exists within the system for the prospect) or a formerly contacted prospect by the user or the user's organization. In particular, the client matching engine 344 may identify related subsidiaries/parent companies as well as straight prospect name matches in the client information database 346. The prospects by client relationship 348, for example, may include business information regarding these clients. Although a prospect may already be a client, the existing client may be presented as a prospect to encourage the user to develop new business areas with the existing client based upon the search results.

Any prospects not matched by the client matching engine 344 in the client information database, at step D', are provided as sets of new prospects by category classification 352. As described above, although not identified within the client information database, business information regarding each new prospect may be available for presentation to the user due to the automated research performed by the prospect classification engine 326 of FIG. 3B when endeavoring to classify each prospect.

Whether identified prospects or new prospects, the client matching engine 344 may enter information regarding the prospects into the client information database 346 for later use. For example, the user may update prospect information when making contact with the identified prospects and again in entering into transactions with the prospect (e.g., migrating the prospect to a new client). Although illustrated as a single client information database 346, the prospect information (e.g., formerly identified as well as newly identified) may be stored in a separate prospect information database or other record keeping region.

Finally, information regarding the identified prospects is delivered to the user. The information may be supplied within a graphical user interface in real time responsive to submitting the request for prospects as described in relation to FIG. 1A. In another example, the identified prospects may be supplied within a spreadsheet or other report, for example emailed to the requesting user.

Along with the prospects' names, the real-time graphical user interface or other report, in some implementations, presents additional information about these companies to the user. For example, additional information about a company can include a size, address, geographic location, revenue, and website. As shown in a screen shot 400 of FIG. 4A, in a particular example, the prospects may be presented to a user in a table. As illustrated, the table may include demographic information such as the company name, country, state, city revenue, and a link to the company's web site. In another example, a link may be provided for accessing internal information of a current client, such as contact references (e.g., names, phone numbers) and present business captured within the system. The prospect information, in some embodiments, may be organized by classification information. For example, if multiple geographies were requested, rather than being intermixed within the screen shot 400, the United States entities (or North American entities) may be grouped together, etc. Further, indication of classifying information may be provided, in other embodiments, in a column of information (e.g., an industry, etc.). Additionally, although illustrated as a single list, the prospects may further be classified by status (e.g., client of user, client of user's organization, preexisting client within system, or new prospect).

In some implementations, an export control 402 provides the user with the opportunity to export the data for analysis and interactive visualization in other programs or tools. Such programs may be developed, for example, from Tableau Software of Seattle, Wash. Further, the export control 402 may provide the opportunity to export the information into a report, such as a spreadsheet document.

In some implementations, the screen shot 400 is presented prior to performing the operational flow 350 of FIG. 3D. For example, a "find additional information . . . " control 404, when actuated, may activate the operational flow 350 to perform search analysis on the prospect results. The list of prospects within the screen shot 400 may be individually selectable, in other embodiments, such that the search is performed on a select subset of suggested prospects (e.g., the prospects the user is most interested in).

Figure 5:
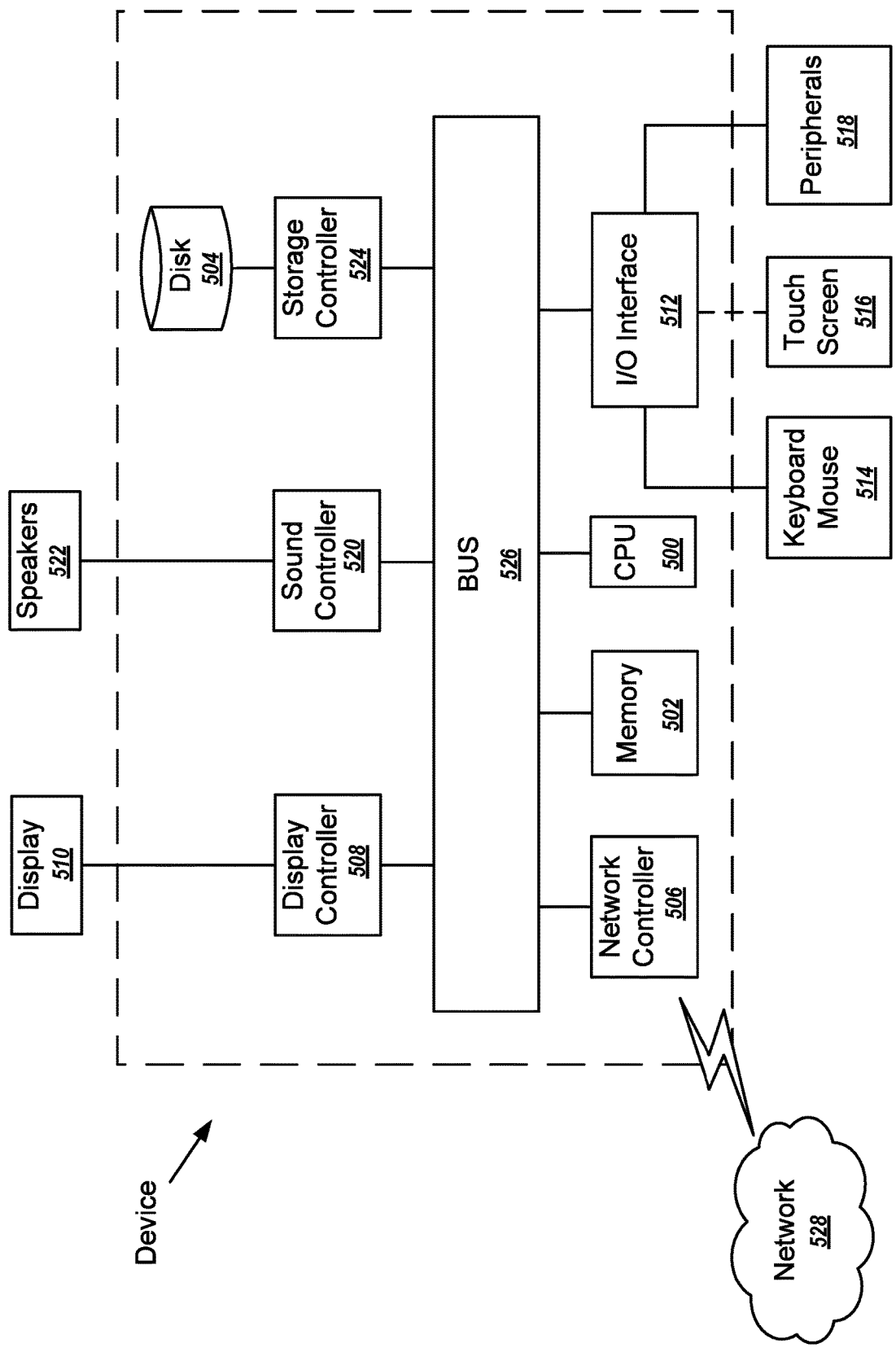
FIG. 5 is a block diagram of an example computing system.

Next, a hardware description of the computing device, mobile computing device, or server according to exemplary embodiments is described with reference to FIG. 5. The attribute engine 106 and web scraping engine 112 of FIG. 1A, the key term generation engine 120 of FIG. 1B, the client term verification engine 304 and the client identification engine 310 of FIG. 3A, the prospect generation engine 318 and the prospect classification engine 326, the key term refining engine 336 of FIG. 3C, and the prospect distilling engine 340 and client matching engine 344 of FIG. 3D may each be embodied on processing circuitry of one or more computing devices such as the computing device of FIG. 5. Further, a user may interface with remote computing systems performing the operations described in the operational flow 100 of FIGS. 1A and 1B, the method 200 of FIG. 2, the operational flow 300 of FIGS. 3A-3C, and/or the operation flow 350 of FIG. 3D via a computing device such as the computing device described below. In FIG. 5, the computing device, mobile computing device, or server includes a CPU 500 (e.g., processing circuitry) which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 500 and an operating system such as Microsoft Windows 5, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The computing device, mobile computing device, or server in FIG. 5 also includes a network controller 506, such as an Intel Ethernet PRO network interface card from Intel Corporation of America, for interfacing with network 528. The network, in some examples, may be the Internet or other searchable network supporting the search engine 306 of FIG. 3A, the search engine 320 or the search engine 328 of FIG. 3B. As can be appreciated, the network 528 can be a public network, such as the Internet, or a private network such as an LAN or WAN network, or any combination thereof and can also include PSTN or ISDN sub-networks. The network 528 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. The display controller 508 and display 510, for example, may present the user interfaces 400, 450 of FIGS. 4A and 4B. General purpose I/O interface also connects to a variety of peripherals 518 including printers and scanners, such as an OfficeJet or DeskJet from Hewlett Packard. The display controller 508 and display 510 may present, for example, the screen shot 400 to the end user.

A sound controller 520 is also provided in the computing device, mobile computing device, or server, such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device, mobile computing device, or server. The storage controller 524, for example, may interface with the client information database 108 and/or data store 118 of FIG. 1A, the business information data store 330 of FIG. 3B, or the client information database 346 of FIG. 3D. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 6:
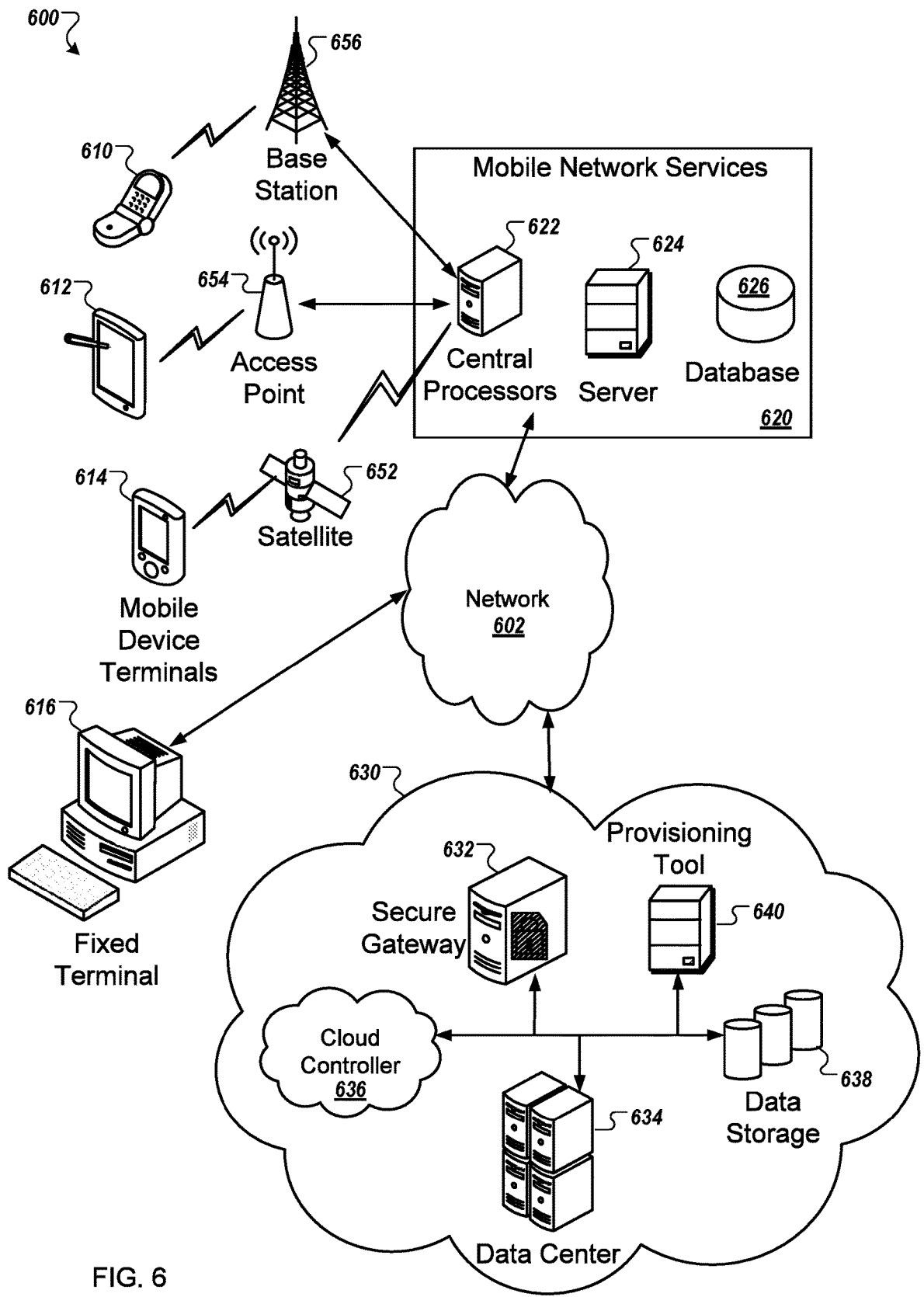
FIG. 6 is a block diagram of an example distributing computing environment including a cloud computing environment.

The functions and features described herein may also be executed by various distributed components of a system. These functions and features, in some examples, include the operational flow 100 performed by the attribute engine 106 and web scraping engine 112 of FIG. 1A, and the key term generation engine 120 of FIG. 1B, the operational flow 300 performed by the client term verification engine 304 and the client identification engine 310 of FIG. 3A, the prospect generation engine 318 and the prospect classification engine 326, and the key term refining engine 336 of FIG. 3C, and the operational flow 350 performed by the prospect distilling engine 340 and client matching engine 344 of FIG. 3D. For example, one or more processors may execute these system functions, wherein the processors are distributed across multiple components communicating in a network. The distributed components may include one or more client and server machines, which may share processing, as shown on FIG. 6, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 630, such as Google Cloud Platform™ to perform at least portions of methods or algorithms detailed above. The processes associated with the methods described herein can be executed on a computation processor, such as the Google Compute Engine by data center 634. The data center 634, for example, can also include an application processor, such as the Google App Engine, that can be used as the interface with the systems described herein to receive data and output corresponding information. The cloud computing environment 630 may also include one or more databases 638 or other data storage, such as cloud storage and a query database. In some implementations, the cloud storage database 638, such as the Google Cloud Storage, may store processed and unprocessed data supplied by systems described herein.

The systems described herein may communicate with the cloud computing environment 630 through a secure gateway 632. In some implementations, the secure gateway 632 includes a database querying interface, such as the Google BigQuery platform. The database querying interface, for example, can enable the querying performed by the attribute generation engine 106 of FIG. 1A, the web scraping engine 112 of FIG. 1A, the client term verification engine 304 of FIG. 3A, the prospect generation engine 318 of FIG. 3B, the prospect classification engine 326 of FIG. 3B, and/or the prospect distilling engine 340 of FIG. 3D.

The cloud computing environment 102 may include a provisioning tool 640 for resource management. The provisioning tool 640 may be connected to the computing devices of a data center 634 to facilitate the provision of computing resources of the data center 634. The provisioning tool 640 may receive a request for a computing resource via the secure gateway 632 or a cloud controller 636. The provisioning tool 640 may facilitate a connection to a particular computing device of the data center 634.

A network 602 represents one or more networks, such as the Internet, connecting the cloud environment 630 to a number of client devices such as, in some examples, a cellular telephone 610, a tablet computer 612, a mobile computing device 614, and a desktop computing device 616. The network 602 can also communicate via wireless networks using a variety of mobile network services 620 such as Wi-Fi, Bluetooth, cellular networks including EDGE, 3G and 4G wireless cellular systems, or any other wireless form of communication that is known. In some embodiments, the network 602 is agnostic to local interfaces and networks associated with the client devices to allow for integration of the local interfaces and networks configured to perform the processes described herein.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for automatically deriving prospect information related to potential new clients, the method comprising:
   obtain, by processing circuitry, identification of one or more organizational attributes, wherein the one or more organizational attributes comprises at least one of an industry attribute, a financial attribute, or a size attribute;
   mining, by the processing circuitry, web source content from each web source of a plurality of web sources;
   identifying, by the processing circuitry, a plurality of organizations, wherein identifying comprises, for each web source,
      deriving, from the respective web source content, prospect information for one or more organizations of the plurality of organizations, wherein,
         for each organization, the prospect information comprises an organization name,
      applying a shallow neural network to perform vector mapping of word vectors of a plurality of terms derived from the respective web source content,
      using the word vectors, identifying, by the processing circuitry, term classification data related to the one or more organizations, wherein the term classification data categorizes the one or more organizations at least in part according to the one or more organizational attributes, and using the term classification data, scoring the one or more organizations;

ranking, by the processing circuitry, the plurality of organizations based at least in part on the scoring;

cross-referencing, by the processing circuitry, the organization name of each organization of the plurality of organizations with a plurality of client records within a transactional platform to determine a client relationship associated with each organization of at least one organization of the plurality of organizations; and causing presentation of the prospect information, by the processing circuitry, to a user of a computing device, wherein the prospect information comprises, for the at least one organization of the plurality of organizations, the client relationship associated with the respective organization.

2. The method of claim 1, wherein the plurality of web sources comprises a plurality of social media feeds.

3. The method of claim 2, further comprising identifying, by the processing circuitry, a plurality of preferred social media feeds related to the user, wherein the plurality of web sources comprises the plurality of preferred social media feeds.

4. The method of claim 1, further comprising, for each web source, applying, by the processing circuitry, natural language processing to the web source content to obtain at least a portion of the plurality of terms.

5. The method of claim 1, further comprising, for each web source, extracting, by the processing circuitry, at least a portion of the plurality of terms from the web source content through one or more machine learning models.

6. The method of claim 1, wherein ranking comprises discarding at least one of the plurality of organizations from consideration.

7. The method of claim 1, wherein cross-referencing comprises associating business information with each organization of at least one organization as a portion of the prospect information of each respective organization.

8. The method of claim 7, wherein the business information comprises one or more organizations related to the respective organization.

9. The method of claim 7, wherein the business information comprises one or more of a size of the respective organization, a geographic location of the respective organization, or a revenue of the respective organization.

10. A system for automatically deriving prospect information related to potential new clients, the system comprising:

a client information database comprising a plurality of client records, each client record including business information related to a respective client of a plurality of clients of a transactional platform; and processing circuitry configured to execute operations comprising obtaining identification of one or more organizational attributes, wherein the one or more organizational attributes comprises at least one of an industry attribute, a financial attribute, or a size attribute, mining web source content from each web source of a plurality of web sources, identifying a plurality of organizations, wherein identifying comprises, for each web source, deriving, from the respective web source content, prospect information for one or more organizations of the plurality of organizations, wherein, for each organization, the prospect information comprises an organization name, applying a shallow neural network to perform vector mapping of word vectors of a plurality of terms derived from the respective web source content, using the word vectors, identifying, by the processing circuitry, term classification data related to the one or more organizations, and using the term classification data, scoring the one or more organizations wherein the term classification data categorizes the one or more organizations at least in part according to the one or more organizational attributes, ranking the plurality of organizations based at least in part on the scoring, cross-referencing the organization name of each organization of the plurality of organizations with the plurality of client records of the client information database to determine a client relationship associated with each organization of at least one organization of the plurality of organizations, and causing presentation of the prospect information to a user of a computing device, wherein the prospect information comprises, for the at least one organization of the plurality of organizations, the client relationship associated with the respective organization.

11. The system of claim 10, wherein the plurality of web sources comprises a plurality of social media feeds.

12. The system of claim 11, wherein the processing circuitry is further configured to execute operations comprising identifying a plurality of preferred social media feeds related to the user, wherein the plurality of web sources comprises the plurality of preferred social media feeds.

13. The system of claim 10, wherein the processing circuitry is further configured to execute operations comprising, for each web source, applying natural language processing to the web source content to obtain at least a portion of the plurality of terms.

14. The system of claim 10, wherein the processing circuitry is further configured to execute operations comprising, for each web source, extracting at least a portion of the plurality of terms from the web source content through one or more machine learning models.

15. The system of claim 10, wherein ranking comprises discarding at least one of the plurality of organizations from consideration.

16. The system of claim 10, wherein cross-referencing comprises associating business information with each organization of at least one organization as a portion of the prospect information of each respective organization.

17. The system of claim 16, wherein the business information comprises one or more organizations related to the respective organization.

18. The system of claim 16, wherein the business information comprises one or more of a size of the respective organization, a geographic location of the respective organization, or a revenue of the respective organization.

* * * * *